July 21, 1970  V. G. MAGORIEN  3,521,478

APPARATUS FOR MEASURING GASES DISSOLVED IN LIQUIDS

Filed Oct. 16, 1967

INVENTOR.
VINCENT G. MAGORIEN
BY Fulwider, Patton, Rieber Lee, and Utecht
ATTORNEYS

United States Patent Office 3,521,478
Patented July 21, 1970

3,521,478
APPARATUS FOR MEASURING GASES DISSOLVED IN LIQUIDS
Vincent G. Magorien, Reseda, Calif., assignor to Seaton-Wilson Manufacturing Co., Incorporated, Burbank, Calif., a corporation of California
Filed Oct. 16, 1967, Ser. No. 675,657
Int. Cl. G01n 7/14
U.S. Cl. 73—19                           5 Claims

ABSTRACT OF THE DISCLOSURE

Apparatus for measuring the amount of gases dissolved in liquids by subjecting the liquid to a vacuum so that the gases dissolved therein come out of solution, returning the gas to substantially atmospheric pressure and measuring its volume. A cylinder with an operating plunger therein has its working chamber connected to a vertical manometer tube and filled with mercury as a liquid piston. The top of the manometer tube is connected through a stopcock to a reservoir for the liquid whose dissolved gas content is to be measured. The height of the mercury piston in the manometer tube is controlled by the position of the plunger in the cylinder which is adjustable by a hand crank. A pressure gauge is connected to the passage between the cylinder and the manometer tube. A quick disconnect is provided for ready assembly and disassembly of the manometer tube with the cylinder.

BACKGROUND OF THE INVENTION

The field of the invention is that of gasometers for measuring the amount of gases dissolved in liquids.

Apparatus for determining the amount of gas present in solids and liquids is known in the prior art as shown, for example, in Rochon, Pat. Nos. 2,749,220 and 2,799,561 for measuring the amount of gas in earth core samples and Coe 3,176,500 for measuring the amount of gas in a metal. The closest to the apparatus of the present invention is that disclosed in the patent to Natelson, No. 2,680,060 for determining the amount of gas dissolved in body fluids such as blood. The patent subjects a liquid to a vacuum to liberate gas dissolved therein laboratory type equipment which lacks easy portability and the simple and rugged construction desired for regular commercial use.

SUMMARY OF THE INVENTION

Gases dissolved in a liquid obey Henry's law that the weight of gas dissolved in the liquid is proportional to the absolute pressure, and can be removed or liberated from the liquid by subjecting it to a reduced pressure. Its presence or absence does not affect the volume of the liquid.

The amount of gas dissolved in various liquids is an important measurement in determining the suitability of the liquid for different purposes and whether it need be subjected to degassing procedures to remove the gas therefrom. An example is the case of hydraulic fluids used in hydraulic operating systems which should have a minimum of gas therein whether in the form of free, entrained or dissolved gas. With too great an amount of gas in the system it becomes soft in its response and the hydraulic fluid should be degassed to prevent such a condition arising whenever the gas dissolved therein exceeds a predetermined safe amount. The apparatus of the present invention provides a means for measuring the amount of gas dissolved in a liquid and determining its suitability for this and other uses. The measurement indicates whether degassing procedures must be carried out before the liquid conforms to various use requirements.

The apparatus according to the present invention comprises a cylinder with a hand-reciprocated plunger therein and having its working chamber receiving mercury as a liquid piston. The chamber is connected to a precision glass manometer tube through a quick disconnect providing for ready assembly and disassembly of the manometer tube connects to a reservoir for the liquid to be tested through a stopcock which can supply the liquid into the manometer tube and then seal the connection to permit a vacuum to be drawn in the tube for the liberation of the dissolved gas from the liquid. Thereafter, the manometer tube is returned to substantially atmospheric pressure and the volume of the liberated gas measured by calibrated indicia at the top of the tube. The stopcock also connects to a vent tube by which the manometer tube may be connected to atmosphere not only to remove the tested liquid but also to check the pressure in the manometer tube at which the amount of the gas was measured. A gauge measures the pressure or vacuum at the connection between the manometer tube and the cylinder. By means of the quick disconnect the manometer tube may be readily disassembled from the cylinder for packing and carrying. All joints are sealed air-tight.

The apparatus according to the present invention is simple, rugged and inexpensive and may be readily disassembled and packed for easy portability.

Other objects and features of the invention will be apparent from the following description and the appended drawings.

DESCRIPTION OF THE PREFERRED EMBODIMENT

Figure 1:
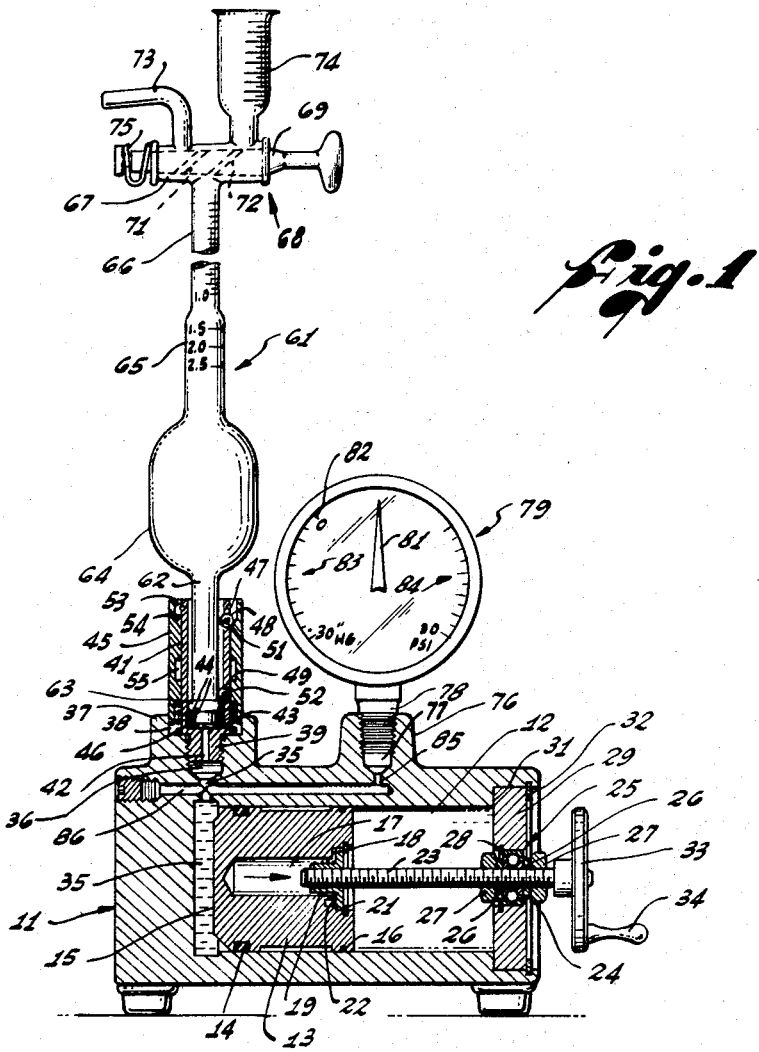
FIG. 1 is a side elevational view, partly in section, of the apparatus of the present invention.

The embodiment of the invention selected for illustration in FIG. 1 employs a base 11 having a front bore therein providing a cylindrical chamber 12. Within the chamber is reciprocably mounted a plunger or piston 13 sealed to the wall of the cylindrical chamber 12 by a resilient O-ring 14 mounted in a circumferential notch in the periphery of the piston 13 adjacent its working face 15. A bearing ring 16 of Teflon, or like material, is mounted in a circumferential notch adjacent the forward face of the piston 13 and the piston is sized and shaped so as to substantially float with respect to the walls of the cylindrical chamber 12 on the O-ring 14 and the centering bearing ring 16.

The piston 13 has a central bore 17 therein from the front and is counterbored to provide a mounting ledge 18 against which is mounted a travelling nut 19 by a snap ring 21. The nut 19 has a disc-like flange at its forward end disposed between the mounting ledge 18 and the snap ring 21 and the flange is prevented from rotating relative the piston by means of a projection on its back face at 22 received within a complementary hole in the piston.

A lead screw 23 is threaded into the travelling nut 19 so that its rear end will be received in the bore 17 and adjacent its forward end is rigidly mounted to the inner race 24 of a ball bearing 25, between washers 26 and lock nuts 27. The ball bearing 25 is mounted by a snap ring 28 within a central opening through a front closing plate 29 mounted in a counterbore in the base 11 to close the cylindrical chamber 12. The front plate 29 is mounted against the ledge 31 defining the counterbore by a snap ring 32. Upon the forward end of the lead screw 23 is rigidly secured a hand wheel 33 having a knob 34 thereon for facilitating rotation of the lead screw 23 and movement of the piston 13 axially of the cylindrical chamber 12 by the travelling nut 19.

A working chamber 35 is provided between the back wall of the cylindrical chamber 12 and the working face 15 of the piston 13. This is communicated by a passage 35 to a central bore 36 in a boss 37 projecting upwardly from the top wall of the base 11 near its back. The bore 36 is counterbored at the top at 38. The bore 36 is threaded to receive a fitting 39 on the lower end of an elongated cup-shaped member 41 whose interior is connected by a bore 42 with the bore 36. Slidably mounted on the exterior of the member 41 is a sleeve 45 guided at its lower edge within the counterbore 38 and biased upwardly by a spring 46 held between the ledge of the counterbore 38 and the upper edge of a bottom counterbore in the sleeve 45. The sleeve 45 is maintained assembled on the member 41 by a snap ring 47.

Adjacent the upper end of the member 41 are three or more circumferentially spaced holes 48 receiving balls 51 therein, the holes being tapered inwardly to prevent the balls 51 moving out of the holes in an inward direction. The upper end of the sleeve 45 is counterbored at 53 to receive the balls 51, the lower wall defining the counterbore being in the form of a conical surface 54 which is biased upwardly against the balls 51 by the spring 46. Intermediate the ends of the member 41 are provided three or more circumferentially spaced holes 49 receiving balls 52 therein and also tapering inwardly to prevent removal of the balls therefrom in an inward direction. The inner surface of the sleeve 45 is provided with an annular notch 55 to receive the balls 52 in the lower position of the sleeve.

Upon the bottom wall of the member 41 is mounted a resilient annular washer 43 against which is pressed the bottom edge of a manometer tube 61. A pair of sealing O-rings 44 are disposed about the bottom end of the tube 61 and seal thereto and against the inner face of an annular notch in the adjacent sidewall of the member 41, the O-rings being received in the notch. The manometer tube 61 has a lower attachment portion 62 about the lower end of which there is an integral projecting ring 63 normally held beneath the balls 52 to press the end edge of the tube against the washer 43.

Above the attachment portion 62 the manometer tube 61 has a large-volume, globular portion 64 above which are stepped calibrated portions 65 and 66 of progressively smaller diameter. Above the calibrated top portion 66 is mounted an integral tapered sleeve 67 of a stopcock 68 whose rotating element 69 has a pair of inclined passages 71 and 72 therethrough. The sleeve 67 communicates with a vent tube 73 and a reservoir 74 and inclined passages 71, 72 will, upon rotation of the element 69, connect the top of the manometer tube 61 to either the vent tube 73 or the reservoir 74; and in an intermediate position the element 69 will seal off the top of the manometer tube. The rotating element 69 of the stopcock is biased inwardly of the sleeve 67 by a U-shaped spring 75.

The manometer tube 61 may be readily assembled with and disassembled from the base 11 through the quick disconnect provided by member 41, sleeve 45 and their associated elements. To remove the manometer tube from the assembled position of FIG. 1, the sleeve 45 is moved downwardly against the bias of spring 46 to relieve the inward force on the balls 51 applied by the conical surface 54, the balls 51 moving freely outwardly into the counterbore 53. This also positions the notch 55 opposite the balls 52 and they are free to move outwardly therein, thereby releasing the ring 63 for passage thereby and upward removal of the manometer tube out of the member 41. When the sleeve 45 is thereafter released it will be held by the snap ring 47.

To reassemble the manometer tube 61 with the base 11, the sleeve 45 is again moved downwardly against spring 46 and the manometer tube inserted into member 41 with sufficient force to compress the resilient washer 43, after which release of the sleeve 45 will force the balls 52 into position above the ring 63 to hold the lower end edge of the manometer tube against the washer 43 in tight relation. Sealing of the manometer tube is effected through the O-ring seals 44 which engage the outer surface of the lower end of the manometer tube and the inner surface of the adjacent notch in the member 41. The balls 51 are forced inwardly by the conical surface 54 on the sleeve 45 to thereby center the manometer tube within the member 41.

A second boss 76 extends upwardly from the top surface of the base 11 and is bored at 77 and threaded to receive a fitting 78 to mount a pressure-vacuum gauge 79. This gauge may be of conventional structure having an indicating needle 81 with a 0 pressure position at 82 and indicating, at one side 83, vacuum blow atmospheric pressure in inches of mercury and, at the outer side 84, pressure above atmospheric in p.s.i. The bore 77 connects through the fitting 78 to the pressure responsive element in the gauge 79 and through a restriction 85 with a passage 86 leading to the chamber 35.

In the operation of the apparatus, the manometer tube 61, the chamber 35 and the communicating passages, including those leading to the gauge 79, are filled with mercury to function as a liquid piston. The amount of mercury used is such that with a minimum working chamber 35 the height of the mercury will extend through the passage 72 and desirably partially into the reservoir 74 to insure that no air bubbles will be entrained in the liquid to be tested which is drawn into the top of the manometer tube. With this amount of mercury in the apparatus, the stopcock element 69 is turned to the position shown in FIG. 1 to communicate the manometer tube with the reservoir 74 and the hand wheel 33 rotated to rotate the lead screw 23 and move the travelling nut 19 and piston 13 toward the left in FIG. 1, thereby moving the mercury column entirely through the manometer tube and passage 72 and into the bottom of the reservoir 74.

The liquid to be tested is then placed in the reservoir 74 and the hand wheel 33 rotated in the opposite direction to move the plunger 13 outwardly a small distance to retract the mercury column into the manometer tube and draw in a measured amount 93 of the liquid to be tested, for example, two cubic centimeters as indicated by the calibrated line 2.0 on the portion 65 of the manometer tube. This is shown by the mercury level 91 in FIG. 2 which shows the stopcock 68 connecting the manometer tube 61 with the reservoir 74 and the liquid to be tested drawn into the manometer tube. It is to be noted that under this condition the gauge 79 registers a little above the 0 atmospheric point, for example, of the order of one and one-half p.s.i., representing the height of the mercury column in the manometer tube to the level 91.

Figure 3:
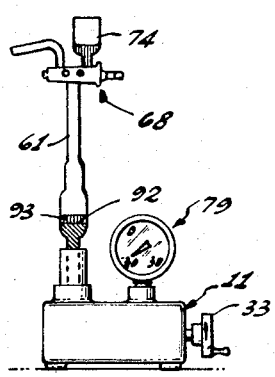
FIG. 3 is a view similar to FIG. 2 with the liquid to be tested subjected to a vacuum.

In FIG. 3, the stopcock 68 has been closed to seal the top of the manometer tube 61 and the hand wheel 33 thereafter rotated to move the plunger 13 its maximum distance forwardly, thereby enlarging the working chamber 35 to its maximum and drawing the mercury level down to a level 92 in the globular portion 64 of the manometer tube. This draws a vacuum within the manometer tube to which the test liquid 93 is subjected. This vacuum will ordinarily be of the order of 28 or 29 inches of mercury.

Figure 2:
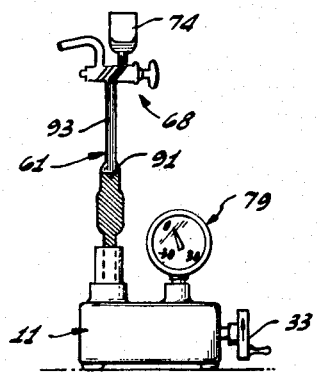
FIG. 2 is a diagrammatic representation of the apparatus after filling with the liquid to be tested.
Figure 4:
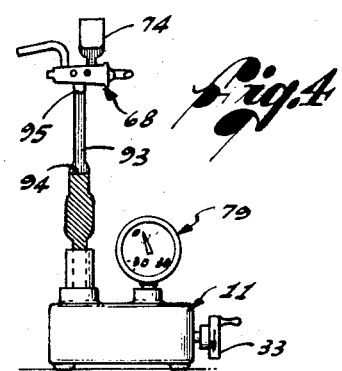
FIG. 4 is a view similar to FIGS. 2 and 3 showing the liquid returned to atmospheric pressure for the measurement of the liberated gas.

After waiting for a period of time, for example, two minutes, for the gas to escape from the liquid, the hand wheel 33 is rotated to move the plunger 13 back toward its rearward position to repressurize the interior of the manometer tube 61 to a gauge 79 reading substantially that which it gave in FIG. 2, the level of the mercury at 94 differing only minutely from its level at 91 in FIG. 2. The liquid 93 returns to a level 95, leaving a short column of liberated gas thereabove and the volume of this liberated gas can be directly read on the calibrations of the upper portions 66 of the manometer tube. The stopcock element 69 is preferably now turned so that the passage 71 communicates the manometer tube 61 through the vent tube 73 to the atmosphere. When this is done the level 95 will not change if the interior of the manometer tube was previously at atmospheric pressure. This serves as a check to verify that the pressure conditions of FIG. 4 is the same as that of FIG. 2.

The hand wheel 33 may now be rotated to move the mercury column 94 upwardly to vent all of the tested liquid from the manometer tube through tube 73, whereupon the stopcock 68 may be returned to the positions of FIGS. 1 and 2 and another test sample of the liquid withdrawn from the reservoir 74 as previously described.

While certain preferred embodiments of the invention have been specifically illustrated and described it will be understood that the invention is not limited thereto as many variations will be apparent to those skilled in the art and the invention is to be given its broadest interpretation within the terms of the following claims.

What is claimed is:

1. Apparatus for measuring the amount of gas dissolved in a liquid, comprising:
   a base having a chamber therein;
   a reciprocable plunger in said chamber defining between the back face of the plunger and the adjacent wall of the chamber a variable volume working chamber, said plunger including traveling nut means thereon and movable therewith;
   a lead screw threaded into said traveling nut means;
   means securing said lead screw in said base for rotation but against axial movement relative thereto whereby to move said plunger in opposite directions to increase and decrease the volume of said working chamber;
   a manometer tube;
   means conecting said working chamber to said manometer tube;
   a pressure gauge;
   means connecting said pressure gauge to said manometer tube and working chamber;
   a reservoir for liquid to be tested adjacent the top of said manometer tube;
   valve means movable to one position to connect said manometer tube to said reservoir and to another position to seal the top of said manometer tube;
   a mercury charge in said manometer tube and working chamber to form a liquid piston, said mercury charge being of a volume to extend adjacent the bottom of said reservoir when said working chamber is at minimum volume, and moving downwardly as the volume of said working chamber is expanded to first draw a measured amount of the liquid to be tested into the manometer tube and after the top of the manometer tube is sealed to establish a vacuum therein to which the liquid is subjected;
   a pair of spaced coupling means mounted on said base, said gauge being mounted in one of said coupling means and said manometer means being mounted in the other of said coupling means; and
   said connecting means for said manometer tube and pressure gauge comprising passage means interconnecting said coupling means and said working chamber.

2. The apparatus as defined in claim 1 in which said plunger has a peripheral sealing ring adjacent one end and a bearing ring adjacent its opposite ends, said rings centering said plunger with respect to the walls of said cylindrical chamber so that said plunger substantially floats therein upon said rings.

3. The apparatus defined in claim 1 including:
   a blind bore extending centrally of said plunger from its forward face to receive said lead screw as the plunger is moved forwardly;
   a counterbore at the forward end of said blind bore;
   said travelling nut means being mounted in at least one of said blind bore and counterbore and rigidly secured to said plunger against movement relative thereto.

4. Apparatus for measuring the amount of gas dissolved in a liquid, comprising:
   means defining a variable volume working chamber;
   a plunger movable to vary the volume of said chamber;
   means mounting said plunger for movement in opposite directions to increase and decrease the volume of said chamber;
   a monometer tube;
   means connecting said chamber to said manometer tube;
   a pressure gauge;
   means connecting said pressure gauge to said manometer tube and chamber;
   a reservoir for liquid to be tested adjacent the top of said manometer tube;
   valve means movable to one position to connect said manometer tube to said reservoir and to another position to seal the top of said manometer tube;
   a mercury charge in said manometer tube and chamber to form a liquid piston, said mercury charge being of a volume to extend adjacent the bottom of said reservoir when said chamber is at minimum volume, and moving downwardly as the volume of said chamber is expanded to first draw a measured amount of the liquid to be tested into the manometer tube and after the top of the manometer tube is sealed to establish a vacuum therein to which the liquid is subjected;
   an elongated cup-shaped member having a passage through its closed end communicating with said variable volume chamber and having its axis extending vertically upwardly;
   circumferentially spaced balls in the walls of said cup-shaped member of a diameter greater than the thickness of the wall;
   a sleeve on the outside of said member and having a notch in its interior surface receiving said balls;
   means biasing said sleeve to move said notch beyond said balls to force said balls inwardly of said member;
   means adjacent the lower end of said manometer tube providing an upper surface engageable by said balls to lock said manometer tube in said member; and
   means for sealing the lower end of said manometer tube in said member whereby the normal position of said sleeve locks the manometer tube in the member in communication with said variable volume chamber while movement of said sleeve against its bias to position the notch opposite said balls permits their outward movement to release the manometer tube for disconnection from said chamber.

5. The apparatus defined in claim 4 including:
   a second set of balls mounted in said member and engaged by an interior conical surface on said sleeve to be biased inwardly by said sleeve bias against the manometer tube to center the manometer tube within said member.

References Cited

UNITED STATES PATENTS

| | | | |
|---|---|---|---|
| 2,680,060 | 6/1954 | Natelson | 23—253 |
| 2,722,825 | 11/1955 | Meyer | 73—19 |
| 2,799,561 | 7/1965 | Rochon | 23—230 |
| 2,915,220 | 12/1959 | Jacobson | 222—3 |
| 3,334,970 | 8/1967 | De Bruyne | 23—254 |

RICHARD C. QUEISSER, Primary Examiner

E. J. KOCH, Assistant Examiner